United States Patent
Fukushi et al.

(10) Patent No.: US 7,103,442 B2
(45) Date of Patent: Sep. 5, 2006

(54) MOTOR DRIVING APPARATUS, CONTROL METHOD THEREFOR, CONTROL PROGRAM THEREFOR, STORAGE MEDIUM READABLE BY COMPUTER STORING CONTROL PROGRAM AND IMAGE FORMING APPARATUS

(75) Inventors: Kenji Fukushi, Toride (JP); Kazuki Miyamoto, Abiko (JP); Masahiro Kurahashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 868 days.

(21) Appl. No.: 09/820,619

(22) Filed: Mar. 30, 2001

(65) Prior Publication Data
US 2001/0028235 A1 Oct. 11, 2001

(30) Foreign Application Priority Data
Apr. 5, 2000 (JP) .................................. 2000-103416

(51) Int. Cl.
*G06F 19/00* (2006.01)

(52) U.S. Cl. ...................... 700/170; 318/685; 318/696; 318/560

(58) Field of Classification Search .................. 700/170; 347/32; 318/560, 672, 685, 696; 355/801, 355/78, 18
See application file for complete search history.

(56) References Cited

U.S. PATENT DOCUMENTS

| | | | | | |
|---|---|---|---|---|---|
| 4,498,665 | A | * | 2/1985 | Watanabe | 271/289 |
| 5,990,651 | A | * | 11/1999 | Iwazawa et al. | 318/685 |
| 6,015,202 | A | * | 1/2000 | Hiramatsu et al. | 347/32 |
| 2001/0028235 | A1 | * | 10/2001 | Fukushi et al. | 318/685 |

* cited by examiner

*Primary Examiner*—Leo Picard
*Assistant Examiner*—Charles Kasenge
(74) *Attorney, Agent, or Firm*—Fitzpatrick, Cella, Harper & Scinto (57) ABSTRACT

A CPU for a motor driving apparatus of an image forming apparatus excites a predetermined phase winding among plural phases of a stepping motor for a predetermined time period. Thereafter, before a rotation of the motor is started, it is judged whether there is the possibility of deviating a positional relationship between a rotor and a stator of the motor from a positional relationship determined by the excitation of the predetermined phase winding for the predetermined time period, by an external force, on the basis of judgement whether a door is opened for jam treatment. If the possibility of deviation is judged, the predetermined phase winding among plural phases of the stepping motor is excited again for a predetermined time period.

9 Claims, 7 Drawing Sheets

MOTOR DRIVING APPARATUS, CONTROL METHOD THEREFOR, CONTROL PROGRAM THEREFOR, STORAGE MEDIUM READABLE BY COMPUTER STORING CONTROL PROGRAM AND IMAGE FORMING APPARATUS

BACKGROUND OF THE INVENTION

1. Field of the Invention

The present invention relates to a motor driving apparatus for controlling a rotation of a stepping motor, a control method therefor, control program therefor, a storage medium readable by a computer storing such control program, and an image forming apparatus such as a copying machine and the like having a recording paper conveying system including the stepping motor as a driving source.

2. Related Background Art

In recent years, in image forming apparatuses such as copying machines, there has been requested an image forming apparatus in which image formation can be performed at a higher speed with a compact construction. In order to permit the image formation at the higher speed with the compact construction, a position of a recording paper being conveyed must be grasped correctly. However, in the conventional techniques, a motor used as a driving source of a recording paper conveying system of an image forming apparatus is a DC motor, and there is dispersion in operations of clutches and solenoids constituting a conveying mechanism and, thus, there is dispersion in a sheet conveying distance. In high speed machines, since such dispersion becomes great, a stepping motor capable of determining a rotational angle correctly in accordance with the number of inputted pulses has been used.

A general method for rising-up the stepping motor will be explained hereinbelow.

Figure 1A:
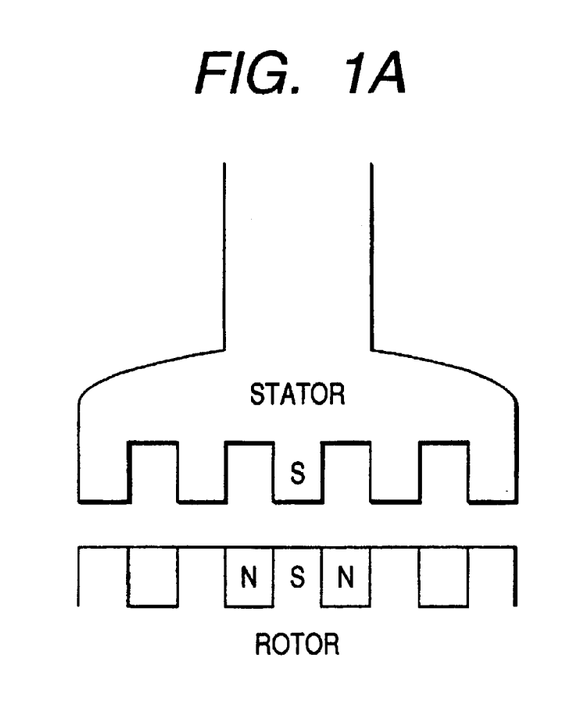
FIG. 1A is an explanatory view showing a positional relationship between a rotor and a stator in a non-excited condition of a stepping motor.
Figure 1B:
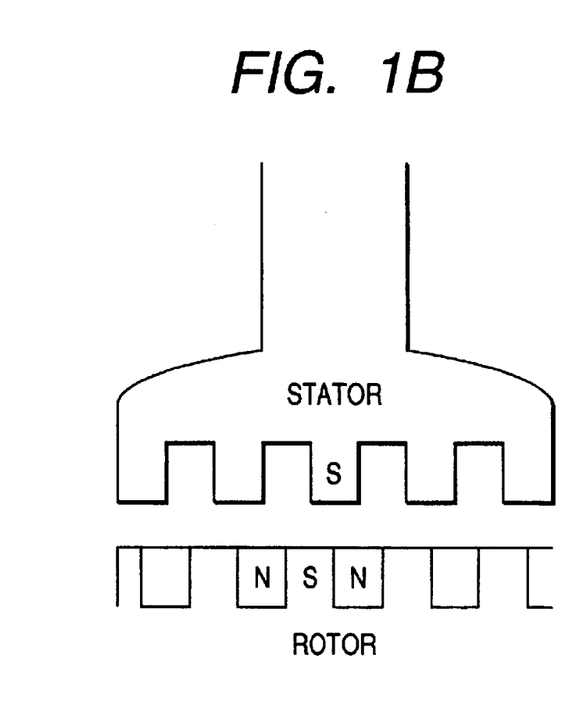
FIG. 1B is an explanatory view showing such a positional relationship in an electrically stabilized condition.

A positional relationship between a stator and a rotor of the stepping motor in a non-excited condition that exciting electrical current is not applied to the stepping motor (for example, power OFF) is as shown in FIG. 1A. In this condition, the rotor is stopped at a most stabilized position by an influence of only a magnetic force. Thereafter, for example, upon initiation of a copying operation, when the electrical current is applied to the stepping motor to cause the exciting, as shown in FIG. 1B, a position where the rotor is electrically stabilized with respect to the rotor is established. In order to continue to rotate the motor, an exciting phase of the motor must be successively changed by driving clocks.

However, when the non-excited condition is transferred to the electrically stabilized condition, in order to correct the deviated positional relationship between the stator and the rotor, torque of the stepping motor is changed greatly by the magnetic force. While the torque is being changed, the exciting phase is switched by the driving clock, with the result that, if the rotor tries to rotate continuously, the motor will be out-of-phase.

As one of methods for preventing the out-of-phase, there is so-called pre-multi-rotation in which the motor is rotated for a predetermined time period upon power ON. The exciting phase is determined by the pre-multi-rotation, and the positional relationship between the stator and the rotor is stored in a storing device, so that the stepping motor can be rotated smoothly when the copying operation is started.

Further, as a second method, there is a method in which only exciting electrical current having predetermined phase is flown through the motor sufficiently before the motor is rotated, and, after the positional relationship between the stator and the rotor is stabilized and the fluctuation of torque is ceased, the rotation of the motor is started.

However, in the recording paper conveying system of the image forming apparatus using the stepping motor as the driving source, when the stepping motor is actually rotated by the above-mentioned pre-multi-rotation, if the recording paper exists on a sheet feed roller to be rotated thereby, the recording sheet is conveyed, with the result that sheet jam may occur.

Further, in compact and high speed image forming apparatuses, since a distance between a sensor for generating a motor driving start signal (and disposed in front of the sheet feed roller) and the sheet feed roller is limited and a time period from when the recording sheet is passed by the sensor to when the sheet reaches the sheet feed roller is short, the exciting cannot be effected sufficiently before the driving of the motor is started.

Further, regardless of the sensor, if the exciting electrical current is previously applied for a predetermined time period, since the current continues to flow through the motor, power consumption will increased.

SUMMARY OF THE INVENTION

An object of the present invention is to provide a motor driving apparatus for rotatingly driving a stepping motor, in which out-of-phase of the motor can be prevented with low power consumption without pre-multi-rotation, and an image forming apparatus in which a stepping motor as a driving source of a recording sheet conveying system is rotatingly driven by such a motor driving apparatus.

To achieve the above object, according to the present invention, in a motor driving apparatus in which exciting electrical current is supplied to windings of plural phases of a stepping motor and the stepping motor is rotatingly driven by successively switching the exciting phases, a controlling method therefor, control program therefor and a storage medium readable by a computer storing such control program, when a power supply of the apparatus is turned ON, after a predetermined phase winding among the plural phases of the stepping motor is excited for a predetermined time period, before rotation of the motor is started, it is judged whether a positional relationship between a rotor and a stator of the motor is deviated, by an external force, from a positional relationship determined by the excitation of the predetermined phase winding for the predetermined time period, and, if affirmative, the predetermined phase winding among the plural phases of the stepping motor is excited again for a predetermined time period.

Further, the present invention provides an image forming apparatus for forming an image on a recording sheet, comprising a recording sheet conveying system using a stepping motor as a driving source, and wherein the stepping motor is rotatingly driven by using the motor driving apparatus according to the present invention.

Further, in the image forming apparatus, there are further provided an opening/closing door attached to a main body of the image forming apparatus and opened for recording sheet jam treatment, detecting means for detecting whether the door is opened or not, and control means for the motor driving apparatus, and the control means judges whether the positional relationship between the rotor and the stator is deviated by the external force on the basis of the fact whether the opening of the door is detected by the detecting means before the driving of the stepping motor is started.

Further, in a motor driving apparatus in which exciting electrical current is supplied to windings of plural phases of a stepping motor and the stepping motor is rotatingly driven by successively switching the exciting phases, when a power supply of the apparatus is turned ON, a predetermined phase winding among the plural phases of the stepping motor is excited for a predetermined time period.

Further, in a controlling method for controlling rotation of a stepping motor in which exciting electrical current is supplied to windings of plural phases of a stepping motor and the stepping motor is rotatingly driven by successively switching the exciting phases, when a power supply of the apparatus is turned ON, only exciting for a predetermined time period is effected.

The other objects and features of the present invention will be more apparent from the following detailed explanation of the invention referring to the accompanying drawings.

DESCRIPTION OF THE PREFERRED EMBODIMENTS

The present invention will now be explained in connection with embodiments thereof with reference to the accompanying drawings.

Figure 2:
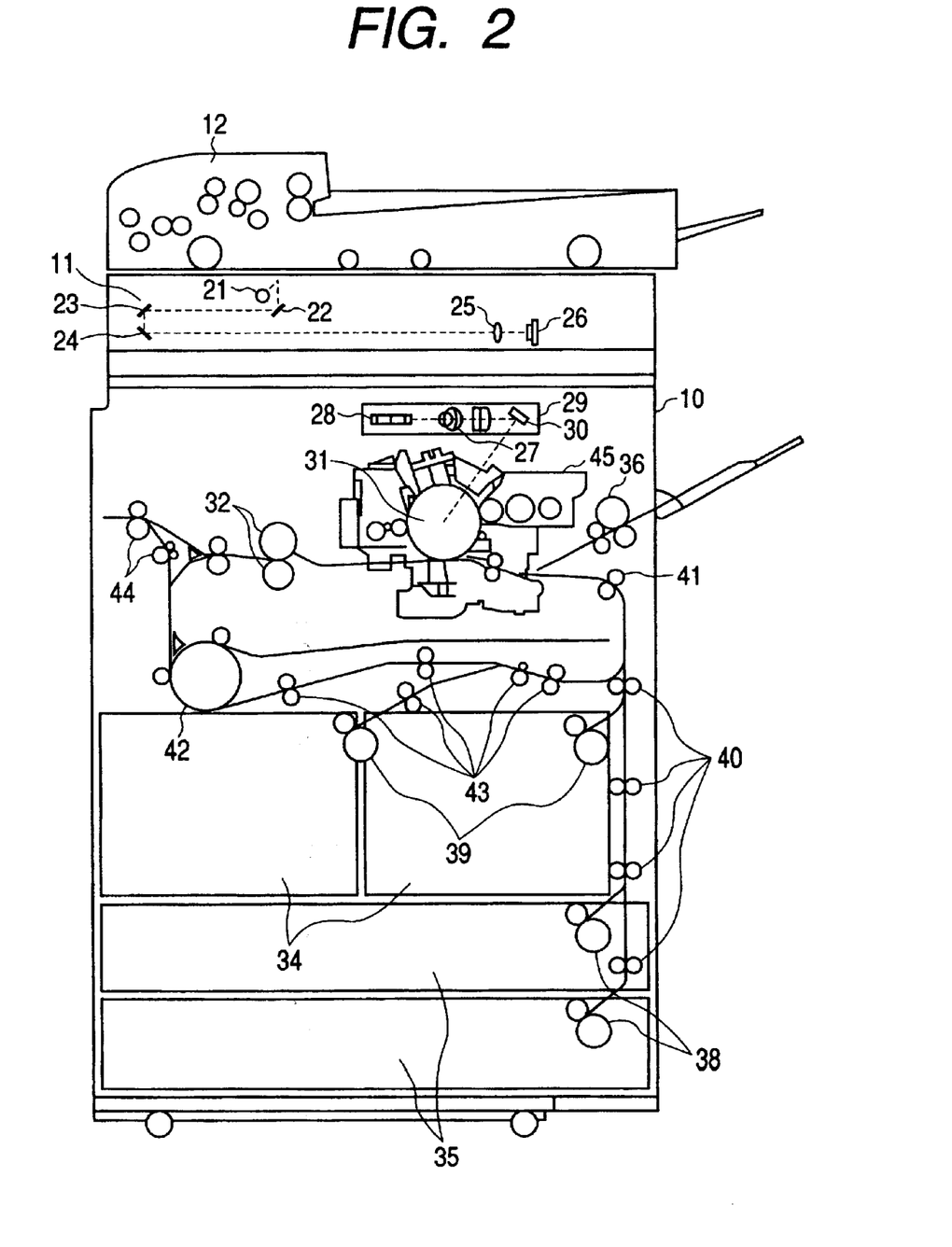
FIG. 2 is a schematic constructural view showing a construction of an image forming apparatus having a motor driving apparatus according to an embodiment of the present invention.

FIG. 2 is a view for explaining a construction of an image forming apparatus according to an embodiment of the present invention, and an image input/output (copy) operation. The image forming apparatus includes a recording sheet conveying system using a stepping Am motor as a driving source, and a motor driving apparatus for rotatingly driving the stepping motor.

As shown in FIG. 2, the image forming apparatus according to the illustrated embodiment is constituted as a laser beam printer and includes an image output portion 10 for recording and outputting (printing) an image of an original on a recording sheet, as image input portion 11 for reading the image data of the original, and an automatic original feeding device 12 disposed above the image input portion 11.

When the image is inputted, i.e., when the image data of the original is read, the original rested on an original plate located on the top of the image input portion 11 is illuminated by light from a light source 21. The light source 21 is shifted in a left-and-right direction (FIG. 2), i.e., a scanning direction. An light image reflected from the original is focused on a CCD 26 through mirrors 22, 23, 24 and a lens 25. In the CCD 26, the focused image is converted into an electrical signal as a digital image data. The image data is image-processed in accordance with the operator's setting condition and then is stored in an image memory (not shown).

On the other hand, when the image is outputted, the image data stored in the image memory is read out by the image output portion 10, and the digital signal of the image data is converted into an analogue signal. Further, the analogue signal is converted into a light signal of a laser beam by a laser illuminating portion 27, and the laser beam is illuminated onto a photosensitive drum 31 through a laser scanner 28, a lens 29 and a mirror 30, thereby scanning the photosensitive drum 31. As a result, an electrostatic latent image corresponding to the image of the original is formed on the photosensitive drum 31. The electrostatic latent image is developed by a developing device 45 as a toner image which is in turn transferred onto the recording sheet being conveyed. Then, the toner image is fixed onto the recording sheet by a fixing roller 32. Thereafter, the recording sheet is discharged out of the apparatus.

Next, the recording sheet conveying system will be described.

Sheet feeding trays 34, 35 are provided at a lower part of a main body of the image forming apparatus, and a manual insertion tray 37 is provided at one side of the main body. A plurality of recording sheets can be stacked on the respective trays. When the recording sheet is supplied, the recording sheets are supplied one by one from the sheet feeding tray 34 or 35 or the manual insertion tray 37 by means of a sheet feeding roller 36, 38 or 39 and the supplied sheet is conveyed to the image output portion 10. Further, the recording sheet is passed through the image output portion 11 by means of sheet conveying rollers 40, 41, 42, 43, 44. These rollers are independently driven by stepping motors (not shown) as driving sources through power transmitting mechanisms such as gears.

Figure 3:
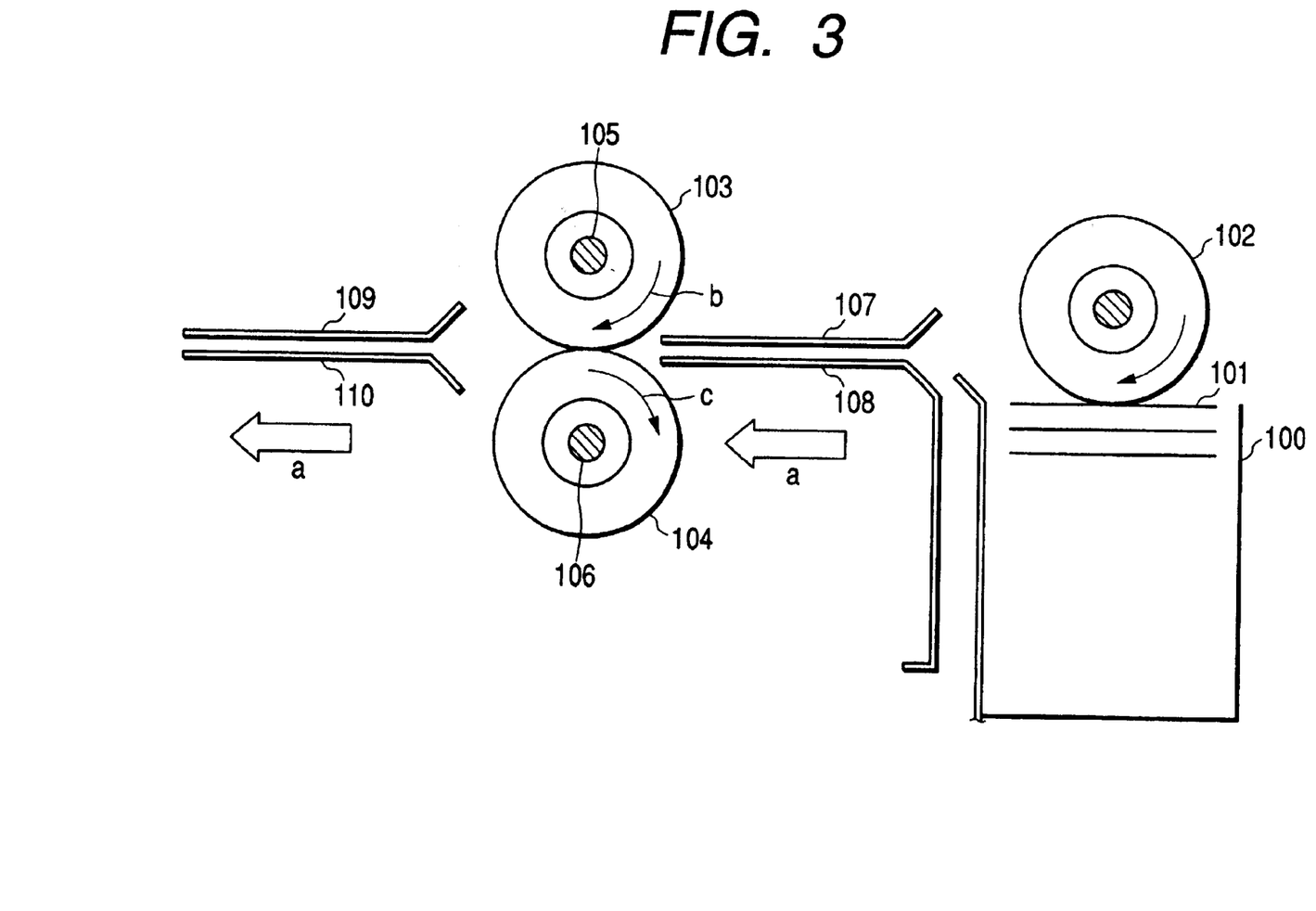
FIG. 3 is a constructural view showing constructions of a sheet feeding tray and a sheet feeding roller portion of the image forming apparatus in detail.

FIG. 3 partially shows the sheet feeding tray 34 (35) and the sheet feeding roller 38 (39) in detail. Here, the sheet feeding roller is constituted by three rollers, i.e., a pick-up roller 102, a feed roller 103 and a retard roller 104.

In FIG. 3, an uppermost sheet in a sheet stack 101 rested on a sheet feeding tray 100 is fed in a direction shown by the arrow a (directing toward the image output portion 10) by the pick-up roller 102. The recording sheet 101 fed by the pick-up roller 102 is passed through between guides 107 and 108 and is sent to a nip between the feed roller 103 and the retard roller 104. The feed roller 103 and the retard roller 104 are positioned in parallel on shafts 105, 105 rotatingly driven by stepping motors (not shown) through power transmitting mechanisms (not shown). The feed roller 103 and the retard roller 104 are rotated together with the shafts 105, 106 in directions shown by the arrows b, c, respectively. Further, the retard roller 104 is attached to the shaft 106 via a torque limiter (not shown).

If the single recording sheet 101 is fed by the pick-up roller 102, since a friction force between the feed roller 103 and the recording sheet is set to be greater than idle rotation torque of the torque limiter of the retard roller 104, the recording sheet is conveyed in the direction a in accordance with the rotational direction b of the feed roller 103 while effecting the idle rotation of the torque limiter.

On the other hand, if two or more recording sheets are fed by the pick-up roller 102, since the idle rotation torque of the torque limiter is set to be greater than a friction force between the recording sheets, the retard roller 104 is rotated in the direction same as the rotational direction c of the shaft 106, with the result that the recording sheets other than the uppermost recording sheet are conveyed to a direction opposite to the sheet feeding direction a. On the other hand, the uppermost recording sheet is conveyed in the direction a by the rotation of the feed roller 103 and then is guided to the image output portion 10 through guides 109, 110. Thus, double-feed of sheets to the image output portion 10 can be prevented.

However, depending upon material of the recording sheet, the friction force between the recording sheets may be changed. When the friction force between the recording sheets is great, if plural recording sheets are conveyed between the feed roller 103 and the retard roller 104, since a difference between the friction force between the retard roller 104 and the recording sheet and the friction force between the recording sheets is small, the recording sheets other than the uppermost recording sheet are not adequately returned to the direction opposite to the sheet feeding direction by the retard roller 104, with the result that, after the uppermost recording sheet was conveyed to the image output portion 10, the other sheets may remain between the feed roller 103 and the retard roller 104.

In a condition that the recording sheets remain between the feed roller 103 and the retard roller 104, when the power supply of the image forming apparatus is turned OFF and the opening/closing door (not shown) of the main body of the image forming apparatus is opened for jam treatment and then the door is closed and the apparatus is restored by turning ON the power supply again, if the stepping motors (not shown) as the driving sources for the rollers 102 to 104 are rotated by the pre-multi-rotation for the purpose of preventing out-of-phase, the recording sheets remained between the rollers 103 and 104 are conveyed, with the result that the sheet jam will occur in the next copying operation.

Figure 4:
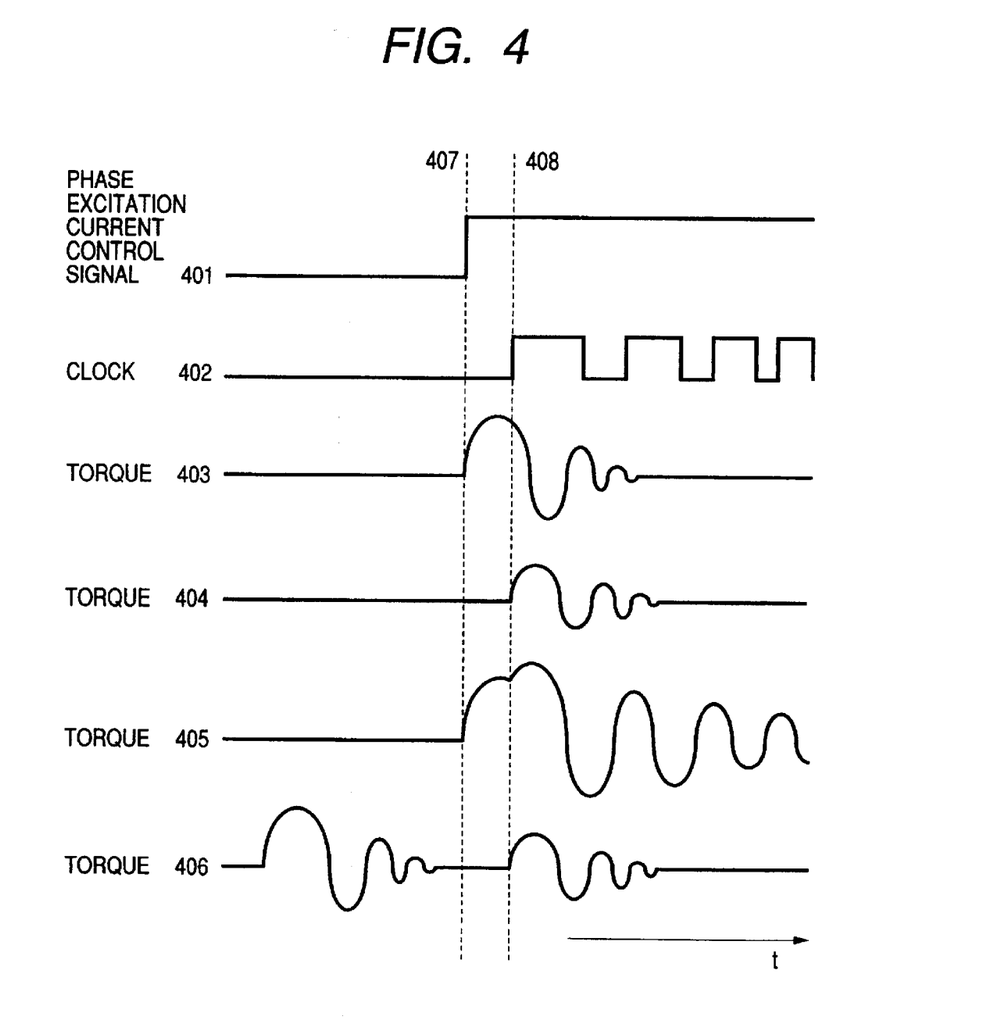
FIG. 4 is a timing chart showing change in torque of a stepping motor in an excited condition and during rotation.

As a second method for preventing the out-of-phase, there is a method in which predetermined phases of the stepping motors as the driving sources for the rollers are excited for a predetermined time period before the sheet is actually conveyed, i.e., for a predetermined time period before rotations of the stepping motors are started. FIG. 4 shows a relationship between exciting current and clock and torques of the stepping motors in this case.

In FIG. 4, the reference numeral 401 indicates a phase excitation current control signal for exciting the predetermined phase; and 407 indicates a timing for flowing the phase excitation current. Further, the reference numeral 402 indicates a driving clock for rotating the motor; and 408 indicates a timing for starting the clock. Torque 403 of the motor given when only the phase excitation current control signal 401 is inputted may be changed greatly at the same time when the excitation current flows. The reason is that, if the positional relationship between the rotor and the stator of the motor set by the phase excitation current control signal 401 is deviated from the actual positional relationship between the rotor and the stator, the deviation is tried to be corrected.

On the other hand, if there is no deviation of the positional relationship, when the clock is triggered, since the motor tries to rotate, torque 404 is generated. In a high speed machine, when an adequate distance between the sensor (provided in front of the sheet feeding roller) for detecting the recording sheet and the sheet feeding roller cannot be obtained, a time period from a timing 407 for flowing the excitation current in response to the sensor to a timing 408 for inputting clock for starting the rotation of the sheet feeding roller becomes short. In such a case, the torque generated in the motor becomes torque 405 as the combination of torques 403 and 404. In this case, since the fluctuation of torque becomes great, the out-of-phase of the motor may occur.

In consideration of the above problems, in the illustrated embodiment, when the power supply of the image forming apparatus is turned ON, only predetermined phase windings of the stepping motor as the driving sources for the rollers 102 to 104 are excited for a predetermined time period in such a manner that the positional relationship between the rotor and the stator of each stepping motor is set to a predetermined positional relationship (referred to as "initial setting positional relationship" hereinafter) as shown in FIG. 1B. Such excitation is effected for the predetermined time period when the power supply of the image forming apparatus is turned ON. That is to say, such excitation is effected sufficiently before the further rotations of the stepping motors are started for sheet feeding, a sufficient time period can be reserved until the torque fluctuation due to such excitation of predetermined phases is ceased. Since the clock for rotating the motors is inputted after the deviation of the positional relationship is corrected, as shown by 406 in FIG. 4, the torque fluctuation caused by the excitation of the predetermined phase can be separated from the torque fluctuation caused by the rotation effected by the clock, thereby preventing the out-of-phase of the motor. Further, since only the excitation of the predetermined phases is effected without actual rotations of the motors due to pre-multi-rotation, the recording sheet jam can also be prevented.

Incidentally, after the power supply of the image forming apparatus is turned ON, before the rotations of the stepping motors are started, when the operator performs the sheet jam treatment by opening the opening/closing door of the main body of the image forming apparatus, external force may acts on the rotary shaft of the stepping motor to deviate the positional relationship between the rotor and the stator from the initial setting positional relationship.

In consideration of this, in the illustrated embodiment, before the rotations of the stepping motors are started (before the sheet is fed), by judging whether the door is opened or not, it is judged whether the positional relationship between the rotor and the stator is deviated, by the external force, from the initial setting positional relationship, and, if affirmative, only the predetermined phase windings of the stepping motors are excited again for a predetermined time period. In this way, even if the positional relationship between the rotor and stator is deviated, by the external force, from the initial setting positional relationship, the deviated positional relationship can be returned to the initial setting positional relationship.

Such control is effected by a control system (provided in the image forming apparatus) for the motor driving apparatus for rotatingly driving the stepping motor. Now, the construction of the motor driving apparatus will be explained with reference to FIG. 5. Incidentally, in the image forming apparatus according to the illustrated embodiment, although the plurality of stepping motors as the driving sources for rotating the rollers 36 and 38 to 44 shown in FIG.

Figure 5:
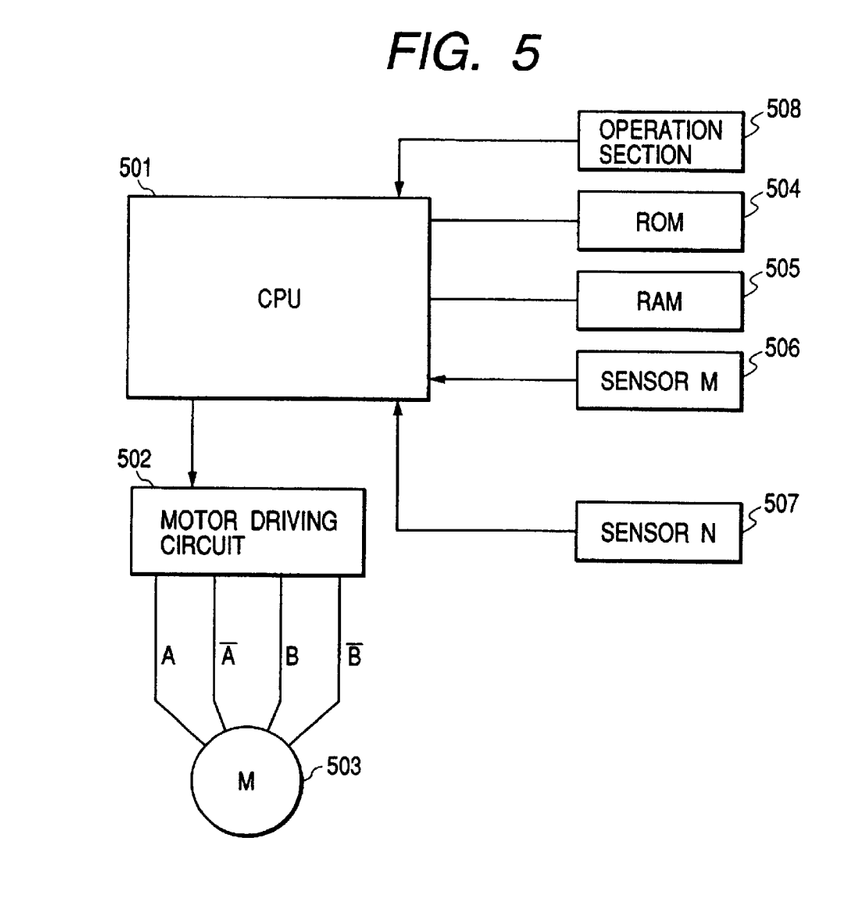
FIG. 5 is a block diagram showing a circuit arrangement of the motor driving apparatus according to the embodiment of the present invention.

1 are provided and a plurality of driving circuits for driving such motors are also provided, in FIG. 5, as a representative example, a single motor driving circuit 502 and a single stepping motor 503 are shown.

In FIG. 5, a CPU 501 for controlling the stepping motor 503 serves to control the driving of the stepping motor 503 via the motor driving circuit 503 on the basis of control program stored in a ROM 504 in accordance with input from an operation section 508 of the image forming apparatus. The ROM 504 corresponds to an embodiment of a storage medium readable by a computer storing control program for the motor driving apparatus according to the present invention. A re-writable RAM 505 is used for temporarily storing data such as various results of calculation effected by the CPU 501 for control.

The motor driving circuit 502 serves to switch the exciting of respective phase windings of the setting motor 503 in a predetermined sequence in accordance with a driving clock signal and a rotational direction signal from the CPU 501, thereby rotatingly driving the stepping motor 503. Further, the motor driving circuit 502 serves to effect ON/OFF-control of excitation current supplied to the stepping motor 503, thereby effecting constant current chopping control so that the excitation current flowing through the motor becomes constant.

Figure 6:
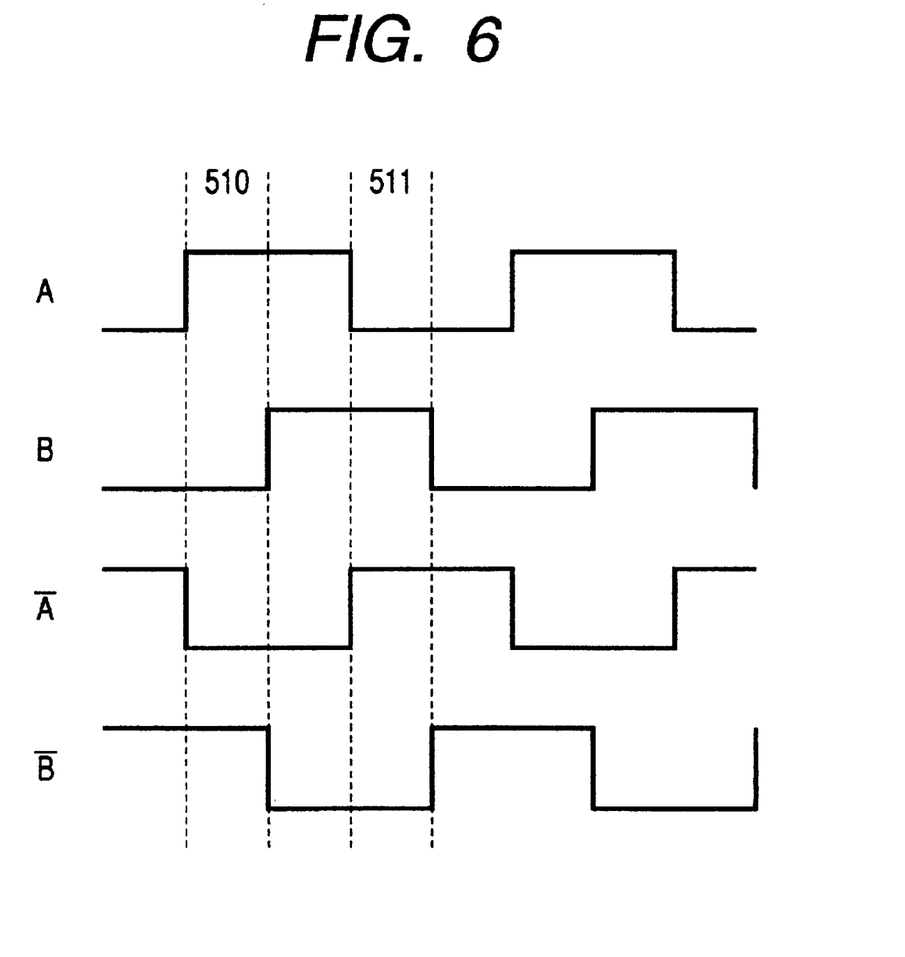
FIG. 6 is a timing chart showing an exciting sequence of a stepping motor of two-phase exciting type.

The stepping motor 503 includes A phase winding, −A phase winding, B phase winding and −B phase winding (in FIG. 5, −A and −B are shown as $\overline{A}$, $\overline{B}$, respectively) wound around plural teeth of the stator (not shown). The stepping motor is driven by two-phase exciting system and is rotatingly driven by successively switching the exciting of A phase, −A phase, B phase and −B phase by an exciting sequence (as shown in FIG. 6) caused by the exciting signal from the motor driving circuit 502. When the power supply of the image forming apparatus is turned ON (when a power supply of the motor driving apparatus is turned ON), as mentioned above, in order to set the positional relationship between the rotor and the stator of the stepping motor 503 to the initial setting positional relationship, for example, only the A phase winding and the −B phase winding are excited with an exciting pattern of period shown by 510 in FIG. 6, and such excitation is effected for a predetermined time period. The control therefor is effected by the CPU 501 through the motor driving circuit 502 in accordance with the control program stored in the ROM 504.

Further, a sensor M 506 serves to detect whether the aforementioned opening/closing door provided on the main body of the image forming apparatus is opened for the recording sheet jam treatment and inform the CPU 501 of the detection result.

After the power supply of the apparatus is turned ON, before the stepping motor 503 is rotatingly driven, if the opening of the door is informed from the sensor M 506, as mentioned above, the CPU 501 judges that the positional relationship between the rotor and the stator of the motor is deviated, by the external force, from the initial setting positional relationship, and the A phase winding and the −B phase winding are excited again for a predetermined time period.

Further, a plurality of sensors N 507 are provided along the recording sheet conveying path and serve to an existing position of the recording sheet, and the detection signal becomes trigger for driving the stepping motor 503 corresponding to the sensor. During the copying operation of the image forming apparatus, when the recording sheet is fed from the sheet feeding tray 34 or 35 or the manual insertion tray 37, any signal of the sensor N 507 representing the passage of the recording sheet at a predetermined position is sent to the CPU 501. Correspondingly, the CPU 501 controls the rising of the motor, on the basis of a pre-determined distance between the sensor in question and the corresponding conveying roller and the speed of the recording sheet being conveyed, in such a manner that, when the recording sheet is passed through said conveying roller, the rotational speed of the stepping motor 503 for rotatingly driving said conveying roller becomes a constant (normal) speed. Incidentally, the sensors N 507 are also used for detecting the recording sheet jam.

Next, the controlling operation of the CPU 501 for controlling the stepping motor 503 will be fully explained with reference to a flow chart shown in FIG. 7. The program for this controlling operation is stored in the ROM 504.

Figure 7:
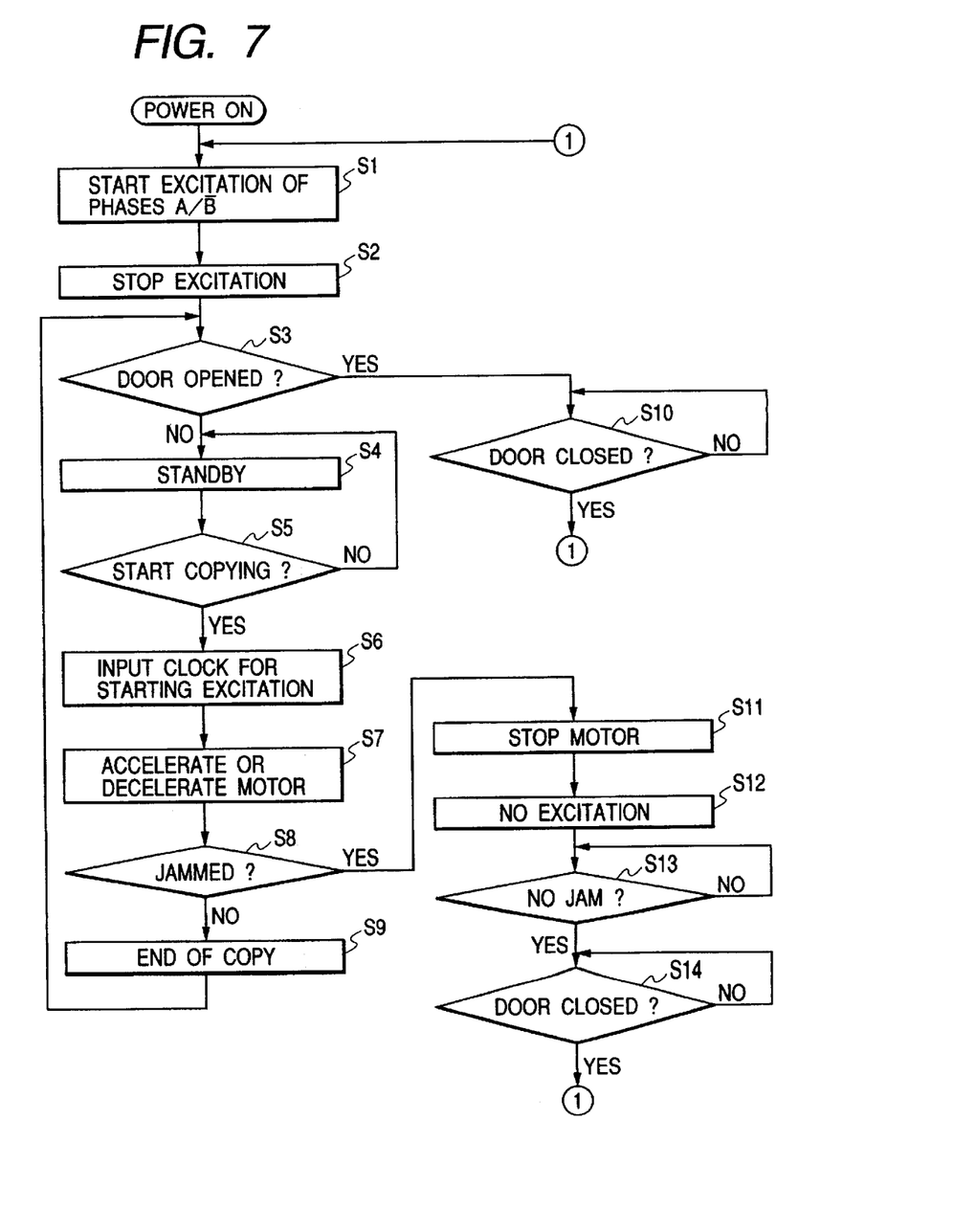
FIG. 7 is a flow chart showing a drive controlling sequence of the stepping motor effected by a CPU of the motor driving apparatus according to the embodiment of the present invention.

When the power supply of the image forming apparatus is turned ON (i.e., when a power supply of the motor driving apparatus is turned ON), the CPU 501 starts the process shown in FIG. 7. First of all, in a step S1, the predetermined phases of the stepping motor 503 are excited, for example, by flowing the current to only the A phase winding and the −B phase winding with the exciting pattern of period shown by 510 in FIG. 6. In this case, if the positional relationship between the rotor and the stator of the stepping motor 503 is deviated from the predetermined positional relationship corresponding to the exciting pattern 510, i.e., the initial setting positional relationship, such deviation can be corrected to establish initial setting positional relationship.

Here, the exciting time may be greater than a time period during which the torque generated when the deviation of the positional relationship is corrected is attenuated completely. Depending upon the stepping motor used and load for driving the stepping motor, the optimum exciting time is 100 ms to several seconds. To this end, in a step S2, the CPU 501 monitors the exciting time and disenergizes the exciting signal to stop the excitation after an appropriate time period is elapsed.

Then, in a step S3, it is judged whether the fact that the opening/closing door provided on the image forming apparatus is detected by the sensor M 506. Here, if the recording sheet jam occurred, the jam is detected by the sensor N 507 and a display (not shown) of the operation portion 508 displays the jam to inform the operator of such jam. Then, the operator opens the door and performs the jam treatment. During this jam treatment, the external force may act on the shaft of the stepping motor 503 to rotate the shaft slightly, with the result that the positional relationship between the rotor and the stator is deviated from the initial setting positional relationship.

Thus, if the fact that the door is opened is detected, the CPU 502 judges that there is the possibility of deviating the positional relationship between the rotor and the stator from the initial setting positional relationship by the external force, and, in a judgement loop of a step S10, the CPU waits until the operator finishes the jam treatment and the fact that the door is closed is detected by the sensor M 506. If such fact is detected, the steps S1, S2 are effected again, thereby performing the exciting of the predetermined phases for the predetermined time period. This re-exciting pattern is not limited to the exciting of A phase and −B phase but depends upon a positional relationship between the rotor and the stator of the stepping motor 503 at that time. For example, at the time when the program s returned from the step S10 to the step S1, if the positional relationship between the rotor and the stator is a positional relationship substantially corresponding to an exciting pattern of period shown by 511 in FIG. 6, B phase and −A phase are excited.

On the other hand, in the step S3, if the door is not opened, the CPU 501 waits until various conditions required for the copying operation are established, and then, in a step S4, a stand-by condition is achieved, and, in a judgment loop of a step S5, copy start command is waiting.

When the copy start command is inputted by depressing a copy start button (not shown) provided on the operation section 508, in a step S6, the CPU 501 starts the copying operation. Then, when the plurality of sensors N 507 detect the recording sheet, timings for starting the rotations of the respective stepping motors are calculated on the basis of the detection signals from the sensors, and a motor excitation control signal for exciting the corresponding stepping motor is outputted immediately before each calculated timing (as shown by 401 in FIG. 4), thereby establishing, for example a condition that the excitation current can be flown to the A phase and the −B phase. After a sufficient time period during which the excitation current flows in the stepping motor 503 is elapsed, the driving clock signal is outputted to the motor driving circuit 502. On the basis of this clock signal, the exciting phases of the stepping motor 503 are successively switched in a circulating fashion with four exciting patterns shown in FIG. 6, thereby rotating the stepping motor 503.

Then, on the basis of the control program stored in the ROM 504, a process for accelerating or decelerating the stepping motor is effected, so that the pulse width of the driving clock signal outputted to the motor driving circuit 502 is decreased or increased step by step, thereby accelerating or decelerating the stepping motor smoothly as much as possible.

By the cooperating action of the stepping motors rotatingly driven in this way, in the image forming apparatus, for recording sheet is fed and conveyed and the copy is executed. During the copying operation, the CPU 501 monitors ON/OFF times of the plural sensors N 507, thereby judging whether the sheet jam occurs or not (step S8). When the sheet jam does not occur during the copying operation and the copying operation is finished in a step S9, the program is returned to the step S3.

On the other hand, in the step S8, if the sheet jam is detected, the CPU 501 stops the clock output to stop the rotations of the stepping motors (step S11) and also stops the exciting (step S12).

Thereafter, in a judgement loop of a step S13, the fact that the jam is not detected by the sensors N 507, i.e., the fact that the jam is eliminated is waiting. When the jam is eliminated, in a judgement loop of step S14, the program is waiting until the fact that the door is closed is detected by the sensor M 506. When the door is closed, the program is returned to the step S1, and the sequence from the step S1 is repeated. In this case, the excitation for the predetermined time period for setting the positional relationship between the rotor and the stator of the stepping motor is effected again.

As mentioned above, in the illustrated embodiment, when the power supply of the image forming apparatus is turned ON, after the predetermined phase windings (for example, A phase and −B phase) among the plural phases of the stepping motor are excited for the predetermined time period, before the copying operation is started, i.e., before the rotation of the stepping motor is started, it is judged whether there is the possibility of deviating the positional relationship between the rotor and the stator of the motor from the positional relationship determined by the excitation of the predetermined phase winding for the predetermined time period, by the external force, on the basis of the opening or closing of the door, and, if the possibility of deviation is judged, the predetermined phase windings among plural phases of the stepping motor are excited again for the predetermined time period. Accordingly, during the subsequent copying operation, the rotation of the stepping motor is not started in the condition that the positional relationship between the rotor and the stator of the stepping motor is deviated from the proper positional relationship, thereby preventing the out-of-phase and thus ensuring the stable operation of the image forming apparatus. Further, unlike to the conventional techniques, in order to prevent the out-of-phase of the stepping motor, since the motor is not rotated by the pre-multi-rotation and only the excitation of the predetermined phase is effected, the occurrence of the recording sheet jam can also be prevented. Further, since the excitation of the predetermined phase itself requires only short time period and is effected only when the door is opened, other than when the power supply is turned ON, the power consumption can be reduced in comparison with the conventional out-of-phase preventing methods.

Incidentally, after the power supply is turned ON, before the rotation of the stepping motor is started, if there is no possibility of deviating the positional relationship between the rotor and the stator by the external force, only the excitation for the predetermined time period after power ON may be effected.

As apparent from the above explanation, in the motor driving apparatus for rotatingly driving the stepping motor, when the power supply of the apparatus is turned ON, after the predetermined phase winding among the plural phases of the stepping motor for the predetermined time period, before the rotation of the motor is started, if there is the possibility of deviating the positional relationship between the rotor and the stator of the motor from the positional relationship determined by the excitation of the predetermined phase winding for the predetermined time period, by the external force, the predetermined phase winding among the plural phases of the stepping motor is excited again for a predetermined time period. Accordingly, the out-of-phase of the stepping motor can be prevented without rotating the stepping motor upon power ON for preventing the out-of-phase and with short time period and few number of excitations and low power consumption. Further, by using the motor driving apparatus to rotate the stepping motor as the driving source of the recording sheet conveying system of the image forming apparatus, the recording sheet is not conveyed by the pre-multi-rotation of the stepping motor for preventing the out-of-phase upon power ON, and, accordingly, the recording sheet jam due to such pre-multi-rotation can be prevented. Further, after the power supply is turned ON, during the image formation, when the stepping motor is rotated to rotate the sheet feeding roller and the conveying roller for the recording sheet on the basis of the signal from the recording sheet detecting sensor, there is no possibility of occurring the out-of-phase. This is particularly effective in a compact and high speed image forming apparatus in which the distance between the sensor and the roller is small and the excitation (before the rotation) for preventing the out-of-phase of the stepping motor must be effected for a short time.

While a preferred embodiment of the present invention was explained, the present invention is not limited to such an embodiment, but, various alterations and modifications can be made within the scope of the invention.

What is claimed is:

1. A motor driving apparatus in which excitation current is supplied to windings of plural phases of a stepping motor and said stepping motor is rotatingly driven by successively switching the exciting phases, comprising:

means for exciting a predetermined phase winding among the plural phases of said stepping motor for a predetermined time period without switching the excitation phases, and stopping excitation after the predetermined time period, when a power supply of equipment in which said motor driving apparatus is contained is turned ON;

means for judging whether there is the possibility of deviating a positional relationship between a rotor and a stator of said motor from a positional relationship determined by the excitation of the predetermined phase winding for the predetermined time period, by an external force, before a rotation of said motor is started; and control means for exciting the predetermined phase winding among the plural phases of said stepping motor again for a predetermined time period without switching the excitation phases, and stopping excitation after the predetermined time period, if the possibility of deviation is judged.

2. A motor driving apparatus according to claim 1, wherein said equipment is an image forming apparatus for forming an image on a sheet and said stepping motor rotates a roller for conveying a recording sheet.

3. A method for controlling a motor driving apparatus in which excitation current is supplied to windings of plural phases of a stepping motor and said stepping motor is rotatingly driven by successively switching the exciting phases, comprising the steps of:

exciting a predetermined phase winding among the plural phases of said stepping motor for a predetermined time period without switching the excitation phases, and stopping excitation after the predetermined time period, when a power supply of equipment in which said motor driving apparatus is contained is turned ON;

judging whether there is the possibility of deviating a positional relationship between a rotor and a stator of said motor from a positional relationship determined by the excitation of the predetermined phase winding for the predetermined time period, by an external force, before a rotation of said motor is started; and controlling to excite the predetermined phase winding among the plural phases of said stepping motor again for a predetermined time period without switching the excitation phases, and stopping excitation after the predetermined time period, if the possibility of deviation is judged.

4. Control program for a motor driving apparatus in which excitation current is supplied to windings of plural phases of a stepping motor and said stepping motor is rotatingly driven by successively switching the exciting phases, comprising the steps of:

exciting a predetermined phase winding among the plural phases of said stepping motor for a predetermined time period without switching the excitation phases, and stopping excitation after the predetermined time period, when a power supply of equipment in which said motor driving apparatus is contained is turned ON;

judging whether there is the possibility of deviating a positional relationship between a rotor and a stator of said motor from a positional relationship determined by the excitation of the predetermined phase winding for the predetermined time period, by an external force, before a rotation of said motor is started; and controlling to excite the predetermined phase winding among the plural phases of said stepping motor again for a predetermined time period without switching the excitation phases, and stopping excitation after the predetermined time period, if the possibility of deviation is judged.

5. A storage medium readable by a computer storing control program for a motor driving apparatus in which excitation current is supplied to windings of plural phases of a stepping motor and said stepping motor is rotatingly driven by successively switching the exciting phases, comprising:

means for exciting a predetermined phase winding among plural phases of said stepping motor for a predetermined time period without switching the excitation phases, and stopping excitation after the predetermined time period, when a power supply of equipment in which said motor driving apparatus is contained is turned ON;

means for judging whether there is the possibility of deviating a positional relationship between a rotor and a stator of said motor from a positional relationship determined by the excitation of the predetermined phase winding for the predetermined time period, by an external force, before a rotation of said motor is started; and control means for exciting the predetermined phase winding the plural phases of said stepping motor again for a predetermined time period without switching the excitation phases, and stopping excitation after the predetermined time period, if the possibility of deviation is judged.

6. An image forming apparatus comprising:

means for forming an image on a recording sheet;

means using a stepping motor as a driving source and adapted to convey the recording sheet;

driving means in which excitation current is supplied to windings of plural phases of said stepping motor and said stepping motor is rotatingly driven by successively switching the exciting phases;

means for exciting a predetermined phase winding among the plural phases of said stepping motor for a predetermined time period without switching the excitation phases, and stopping excitation after the predetermined time period, when a power supply of the image forming apparatus is turned ON;

means for judging whether there is the possibility of deviating a positional relationship between a rotor and a stator of said motor from a positional relationship determined by the excitation of the predetermined phase winding for the predetermined time period, by an external force, before a rotation of said motor is started; and control means for exciting the predetermined phase winding among the plural phases of said stepping motor again for a predetermined time period without switching the excitation phases, and stopping excitation after the predetermined time period, if the possibility of deviation is judged.

7. An image forming apparatus according to claim 6, further comprising:

an opening/closing door attached to a main body of said image forming apparatus and opened for recording sheet jam treatment; and detecting means for detecting whether said door is opened or not, wherein said control means of said driving means judges whether there is the possibility that the positional relationship between said rotor and said stator is deviated by the external force, on the basis of whether the opening of said door is detected by said detecting means before the driving of said stepping motor is started.

8. A motor driving apparatus in which exciting electrical current is supplied to windings of plural phases of a stepping motor and said stepping motor is rotatingly driven by successively switching the exciting phases, wherein when a power supply of equipment in which said motor driving apparatus is contained is turned ON, a predetermined phase winding among the plural phases of said stepping motor is excited for a predetermined time period without switching the excitation phases, and stopping excitation after the predetermined time period.

9. A method for controlling a motor driving apparatus in which exciting electrical current is supplied to windings of plural phases of a stepping motor and said stepping motor is rotatingly driven by successively switching the exciting phases, wherein exciting a predetermined phase winding among the plural phases of said stepping motor for a predetermined time period without switching the excitation phases, and stopping excitation after the predetermined time period is effected when a power supply of equipment in which said motor driving apparatus is contained is turned ON.

* * * * *

UNITED STATES PATENT AND TRADEMARK OFFICE
CERTIFICATE OF CORRECTION

PATENT NO. : 7,103,442 B2
APPLICATION NO. : 09/820619
DATED : September 5, 2006
INVENTOR(S) : Kenji Fukushi et al.

It is certified that error appears in the above-identified patent and that said Letters Patent is hereby corrected as shown below:

COLUMN 1:
Line 46, "rotor" should read --motor--.

COLUMN 2:
Line 23, "increased." should read --be increased.--.

COLUMN 3:
Line 56, "Am motor" should read --motor--.

COLUMN 4:
Line 6, "An light" should read --A light--.
Line 56, "shafts 105, 105" should read --shafts 105, 106--.

COLUMN 6:
Line 43, "acts on" should read --act on--.

COLUMN 7:
Line 13, "re-writable" should read --rewritable--.

COLUMN 8:
Line 4, "pre-determined" should read --predetermined--.
Line 65, "program s returned" should read --program is returned--.

UNITED STATES PATENT AND TRADEMARK OFFICE
CERTIFICATE OF CORRECTION

PATENT NO. : 7,103,442 B2
APPLICATION NO. : 09/820619
DATED : September 5, 2006
INVENTOR(S) : Kenji Fukushi et al.

It is certified that error appears in the above-identified patent and that said Letters Patent is hereby corrected as shown below:

COLUMN 10:
Line 11, "unlike to" should read --unlike--.
Line 17, "only short" should read --only a short--.
Line 44, "few number" should read --low number--.
Line 57, "occurrng the out-of-phase." should read --the out-of-phase occurring.--.

Signed and Sealed this

Twentieth Day of March, 2007

JON W. DUDAS
*Director of the United States Patent and Trademark Office*